(12) United States Patent
Winther-Jensen et al.

(10) Patent No.: US 10,577,700 B2
(45) Date of Patent: Mar. 3, 2020

(54) BREATHABLE ELECTRODE STRUCTURE AND METHOD FOR USE IN WATER SPLITTING

(71) Applicant: AQUAHYDREX PTY LTD, New South Wales (AU)

(72) Inventors: Bjorn Winther-Jensen, Mount Waverley (AU); Douglas MacFarlane, East Brighton (AU); Orawan Winther-Jensen, Mount Waverley (AU)

(73) Assignee: AQUAHYDREX PTY LTD, North Wollongong (AU)

( * ) Notice: Subject to any disclaimer, the term of this patent is extended or adjusted under 35 U.S.C. 154(b) by 0 days.

(21) Appl. No.: 16/146,353

(22) Filed: Sep. 28, 2018

(65) Prior Publication Data
US 2019/0093244 A1    Mar. 28, 2019

Related U.S. Application Data

(63) Continuation of application No. 14/406,797, filed as application No. PCT/AU2012/000668 on Jun. 12, 2012, now Pat. No. 10,087,536.

(51) Int. Cl.
*C25B 11/03* (2006.01)
*C25B 9/10* (2006.01)
(Continued)

(52) U.S. Cl.
CPC .............. *C25B 11/035* (2013.01); *C25B 1/04* (2013.01); *C25B 1/06* (2013.01); *C25B 1/10* (2013.01); *C25B 9/08* (2013.01); *C25B 9/10* (2013.01); *C25B 11/0442* (2013.01); *C25B 11/0489* (2013.01); *Y02E 60/366* (2013.01)

(58) Field of Classification Search
CPC ........... C25B 11/035; C25B 1/06; C25B 1/10; C25B 9/08; C25B 9/10; H01M 4/8605
See application file for complete search history.

(56) References Cited

U.S. PATENT DOCUMENTS

| 1,721,407 A | 7/1929 | Rodolphe |
| 3,284,243 A | 11/1966 | Von Sturm |

(Continued)

FOREIGN PATENT DOCUMENTS

| CA | 2062739 A1 | 12/1990 |
| CA | 1333579 C | 12/1994 |

(Continued)

OTHER PUBLICATIONS

Chaparro et al., Study of electrochemical instabilities of PEMFC electrodes in aqueous solution by means of membrane inlet mass spectrometry, Journal of Electroanalytical Chemistry 591 (2006), pp. 69-73.

(Continued)

*Primary Examiner* — Nicholas A Smith
(74) *Attorney, Agent, or Firm* — Leydig, Voit & Mayer, Ltd.

(57) ABSTRACT

The present invention relates to a water splitting cell having at least one electrode comprising a porous membrane, wherein gas produced at the electrode diffuses out of the cell via the porous membrane, separating the gas from the reaction at the electrode without bubble formation.

18 Claims, 5 Drawing Sheets

(51) Int. Cl.
  *C25B 9/08* (2006.01)
  *C25B 1/10* (2006.01)
  *C25B 1/06* (2006.01)
  *C25B 1/04* (2006.01)
  *C25B 11/04* (2006.01)

(56) References Cited

U.S. PATENT DOCUMENTS

| | | |
|---|---|---|
| 3,342,639 A | 9/1967 | Rodolphe |
| 3,410,770 A | 11/1968 | Buechler |
| 3,553,029 A | 1/1971 | Kordesch et al. |
| 3,697,410 A | 10/1972 | Johnson et al. |
| 3,847,567 A | 11/1974 | Kalina |
| 3,854,994 A | 12/1974 | Binder et al. |
| 3,905,884 A | 9/1975 | Parenti, Jr. et al. |
| 3,923,629 A | 12/1975 | Shaffer |
| 3,980,545 A | 9/1976 | De Lachaux et al. |
| 4,020,389 A | 4/1977 | Dickson et al. |
| 4,042,481 A | 8/1977 | Kelly |
| 4,048,383 A | 9/1977 | Clifford |
| 4,077,863 A | 3/1978 | Nasser |
| 4,086,155 A | 4/1978 | Jonville |
| 4,091,176 A | 5/1978 | Alfenaar |
| 4,091,177 A | 5/1978 | Heffler |
| 4,299,682 A | 11/1981 | Oda et al. |
| 4,394,244 A | 7/1983 | Divisek et al. |
| 4,407,907 A | 10/1983 | Takamura et al. |
| 4,431,494 A | 2/1984 | Mcintyre |
| 4,432,859 A | 2/1984 | Andreassen et al. |
| 4,451,347 A | 5/1984 | Wullenweber |
| 4,526,818 A | 7/1985 | Hoshikawa et al. |
| 4,564,427 A | 1/1986 | Gruver et al. |
| 4,568,442 A | 2/1986 | Goldsmith |
| 4,581,116 A | 4/1986 | Plowman et al. |
| 4,585,532 A | 4/1986 | Martin et al. |
| 4,586,999 A | 5/1986 | Goldsmith et al. |
| 4,650,554 A | 3/1987 | Gordon |
| 4,656,103 A | 4/1987 | Reichman et al. |
| 4,684,353 A | 8/1987 | Desouza |
| 4,720,331 A | 1/1988 | Billings |
| 4,722,773 A | 2/1988 | Plowman et al. |
| 4,790,915 A | 12/1988 | Winsel et al. |
| 4,846,952 A | 7/1989 | Gardner, Sr. et al. |
| 4,865,925 A | 9/1989 | Ludwig et al. |
| 4,895,634 A | 1/1990 | Giuffre et al. |
| 4,936,972 A | 6/1990 | Lohberg |
| 5,104,497 A | 4/1992 | Tetzlaff et al. |
| 5,169,612 A | 12/1992 | Nielsen |
| 5,242,765 A | 9/1993 | Naimer et al. |
| 5,300,206 A | 4/1994 | Allen et al. |
| 5,336,570 A | 8/1994 | Dodge, Jr. |
| 5,376,253 A | 12/1994 | Rychen et al. |
| 5,395,501 A | 3/1995 | Rohrbacker et al. |
| 5,396,253 A | 3/1995 | Chia |
| 5,423,967 A | 6/1995 | Kunimatsu et al. |
| 5,538,608 A | 7/1996 | Furuya |
| 5,650,058 A | 7/1997 | Wenske |
| 5,650,243 A | 7/1997 | Ferment |
| 5,693,202 A | 12/1997 | Gestermann et al. |
| 5,843,297 A | 12/1998 | Schmid et al. |
| 5,998,057 A * | 12/1999 | Koschany ............ C25B 9/10 429/475 |
| 6,008,449 A | 12/1999 | Cole |
| 6,033,549 A | 3/2000 | Peinecke et al. |
| 6,045,942 A | 4/2000 | Miekka et al. |
| 6,110,334 A | 8/2000 | Lohrberg |
| 6,127,061 A | 10/2000 | You-Keung et al. |
| 6,165,332 A | 12/2000 | Gestermann et al. |
| 6,203,676 B1 | 3/2001 | Phillips et al. |
| 6,317,248 B1 | 11/2001 | Agrawal et al. |
| 6,368,473 B1 | 4/2002 | Furuya et al. |
| 6,444,347 B1 | 9/2002 | Ouvry et al. |
| 6,503,656 B1 | 1/2003 | Bannai et al. |
| 6,733,639 B2 | 5/2004 | Busse et al. |
| 7,001,688 B2 | 2/2006 | Ito et al. |
| 7,049,803 B2 | 5/2006 | Dörner et al. |
| 7,220,513 B2 | 5/2007 | Rohwer et al. |
| 7,229,944 B2 | 6/2007 | Shao-horn et al. |
| 7,245,414 B2 | 7/2007 | Liang et al. |
| 7,314,539 B2 | 1/2008 | Brand et al. |
| 7,326,329 B2 | 2/2008 | Gomez |
| 7,357,852 B2 | 4/2008 | Woudenberg et al. |
| 7,459,065 B2 | 12/2008 | Kelly et al. |
| 7,498,099 B2 | 3/2009 | Otohata et al. |
| 7,651,602 B2 | 1/2010 | Helmke et al. |
| 8,123,915 B2 | 2/2012 | Richards et al. |
| 8,182,959 B2 | 5/2012 | Du et al. |
| 8,241,818 B2 | 8/2012 | Ji |
| 8,329,008 B2 | 12/2012 | Maekawa et al. |
| 8,349,151 B2 | 1/2013 | Schmitt et al. |
| 8,349,165 B2 | 1/2013 | Tanaka et al. |
| 8,940,151 B1 | 1/2015 | Hartvigsen et al. |
| 9,252,449 B2 | 2/2016 | Shinohara et al. |
| 9,708,719 B2 | 7/2017 | Swiegers et al. |
| 9,871,255 B2 | 1/2018 | Swiegers et al. |
| 9,938,627 B2 | 4/2018 | Winther-Jensen et al. |
| 10,026,967 B2 | 7/2018 | Swiegers et al. |
| 10,224,552 B2 | 3/2019 | Bulan et al. |
| 10,297,834 B2 | 5/2019 | Swiegers et al. |
| 10,355,283 B2 | 7/2019 | Swiegers et al. |
| 2002/0068215 A1 | 6/2002 | Hamada et al. |
| 2002/0150812 A1 | 10/2002 | Kaz et al. |
| 2002/0153262 A1 | 10/2002 | Uno et al. |
| 2003/0035990 A1 | 2/2003 | Washima |
| 2003/0162072 A1 | 8/2003 | Oosterkamp |
| 2004/0040838 A1 | 3/2004 | Helmke et al. |
| 2004/0229107 A1 | 11/2004 | Smedley |
| 2004/0262153 A1 | 12/2004 | Pinter et al. |
| 2005/0003255 A1 | 1/2005 | Shimizu et al. |
| 2005/0036941 A1 | 2/2005 | Bae et al. |
| 2005/0106450 A1 | 5/2005 | Castro et al. |
| 2005/0126924 A1 | 6/2005 | Gomez |
| 2005/0130023 A1 | 6/2005 | Lebowitz et al. |
| 2006/0228606 A1 | 10/2006 | Fiebig et al. |
| 2006/0272698 A1 | 12/2006 | Durvasula |
| 2007/0015040 A1 | 1/2007 | Li et al. |
| 2007/0080069 A1 | 4/2007 | Melosi |
| 2007/0099072 A1 | 5/2007 | Hennige et al. |
| 2007/0131556 A1 | 6/2007 | Lambie |
| 2007/0196702 A1 | 8/2007 | Sridhar et al. |
| 2007/0231669 A1 | 10/2007 | Ghosh |
| 2007/0246351 A1 | 10/2007 | Smola et al. |
| 2007/0289707 A1 | 12/2007 | Rohland et al. |
| 2008/0014491 A1 | 1/2008 | Yajima et al. |
| 2008/0032181 A1 | 2/2008 | Yamamoto |
| 2008/0070076 A1 | 3/2008 | Makita et al. |
| 2008/0155813 A1 | 7/2008 | Dopp et al. |
| 2008/0160357 A1 | 7/2008 | Pashley et al. |
| 2008/0169188 A1 | 7/2008 | Gil et al. |
| 2008/0206615 A1 | 8/2008 | Nicotera et al. |
| 2008/0223439 A1 | 9/2008 | Deng et al. |
| 2008/0226966 A1 | 9/2008 | Dillard et al. |
| 2008/0248350 A1 | 10/2008 | Little et al. |
| 2008/0264780 A1 | 10/2008 | Kato et al. |
| 2008/0311463 A1 | 12/2008 | Park et al. |
| 2009/0000574 A1 | 1/2009 | Sugimasa et al. |
| 2009/0008261 A1 | 1/2009 | Kotzeva et al. |
| 2009/0035631 A1 | 2/2009 | Zagaja et al. |
| 2009/0052129 A1 | 2/2009 | Tsai |
| 2009/0061267 A1 | 3/2009 | Monzyk et al. |
| 2009/0078568 A1 | 3/2009 | Ramaswami et al. |
| 2009/0081501 A1 | 3/2009 | Vu et al. |
| 2009/0101521 A1 | 4/2009 | Bayer et al. |
| 2009/0151150 A1 | 6/2009 | Ayala et al. |
| 2009/0152118 A1 | 6/2009 | Sugimasa et al. |
| 2009/0153465 A1 | 6/2009 | Shinn et al. |
| 2009/0162714 A1 | 6/2009 | Nakanishi et al. |
| 2009/0165933 A1 | 7/2009 | Lösch et al. |
| 2009/0233153 A1 | 9/2009 | Carlisle et al. |
| 2009/0272648 A1 | 11/2009 | Pratt |
| 2009/0294283 A1 | 12/2009 | Norman et al. |
| 2009/0305084 A1 | 12/2009 | Crookes et al. |
| 2009/0325014 A1 | 12/2009 | Newkirk |
| 2010/0009232 A1 | 1/2010 | Rajantie et al. |

(56) References Cited

U.S. PATENT DOCUMENTS

| | | | |
|---|---|---|---|
| 2010/0032221 A1 | 2/2010 | Storey | |
| 2010/0039594 A1 | 2/2010 | Golan et al. | |
| 2010/0130776 A1 | 5/2010 | Christensen et al. | |
| 2010/0155258 A1 | 6/2010 | Kirk et al. | |
| 2010/0196800 A1 | 8/2010 | Markoski et al. | |
| 2010/0219077 A1 | 9/2010 | Sohn | |
| 2010/0288647 A1 | 11/2010 | Highgate | |
| 2010/0314038 A1 | 12/2010 | Tanuma | |
| 2010/0314261 A1 | 12/2010 | Perry | |
| 2011/0024289 A1 | 2/2011 | Bulan et al. | |
| 2011/0042228 A1 | 2/2011 | Hinatsu et al. | |
| 2011/0229790 A1 | 9/2011 | Sato et al. | |
| 2011/0233072 A1 | 9/2011 | Deptala et al. | |
| 2011/0244358 A1 | 10/2011 | Yamauchi et al. | |
| 2011/0253526 A1 | 10/2011 | McAlister | |
| 2011/0311903 A1 | 12/2011 | Bulan et al. | |
| 2012/0003552 A1 | 1/2012 | Barnett et al. | |
| 2012/0009331 A1 | 1/2012 | Kwon et al. | |
| 2012/0021303 A1 | 1/2012 | Amendola et al. | |
| 2012/0028154 A1 | 2/2012 | Owejan et al. | |
| 2012/0040254 A1 | 2/2012 | Amendola et al. | |
| 2012/0115049 A1 | 5/2012 | Rinzler et al. | |
| 2012/0149789 A1 | 6/2012 | Greenbaum | |
| 2012/0183879 A1 | 7/2012 | Okada et al. | |
| 2012/0237848 A1 | 9/2012 | Mittelsteadt et al. | |
| 2012/0308807 A1 | 12/2012 | Edwards | |
| 2012/0321988 A1 | 12/2012 | Sharman | |
| 2013/0017414 A1 | 1/2013 | He | |
| 2013/0017470 A1 | 1/2013 | Hotta et al. | |
| 2013/0078536 A1 | 3/2013 | Bulan et al. | |
| 2013/0092532 A1 | 4/2013 | Monzyk et al. | |
| 2013/0101923 A1 | 4/2013 | Darling | |
| 2013/0183591 A1 | 7/2013 | Dickson | |
| 2013/0189592 A1 | 7/2013 | Roumi et al. | |
| 2013/0206609 A1 | 8/2013 | Anagnostopoulos | |
| 2013/0313126 A1 | 11/2013 | Raatschen et al. | |
| 2014/0048423 A1 | 2/2014 | Swiegers et al. | |
| 2015/0001067 A1 | 1/2015 | Mantai et al. | |
| 2015/0013225 A1 | 1/2015 | Al-muhaish et al. | |
| 2015/0041410 A1 | 2/2015 | Niksa et al. | |
| 2015/0047988 A1 | 2/2015 | Kettner et al. | |
| 2015/0151985 A1 | 6/2015 | Johnson et al. | |
| 2015/0222002 A1 | 8/2015 | Graves et al. | |
| 2015/0292094 A1 | 10/2015 | Swiegers et al. | |
| 2015/0349350 A1 | 12/2015 | Liu et al. | |
| 2016/0121752 A1 | 5/2016 | Takeyama | |
| 2016/0312370 A1 | 10/2016 | Swiegers et al. | |
| 2016/0322649 A1 | 11/2016 | Swiegers et al. | |
| 2016/0376173 A1 | 12/2016 | Swiegers et al. | |
| 2017/0200561 A1 | 7/2017 | Swiegers et al. | |
| 2017/0356094 A1 | 12/2017 | Winther-Jensen et al. | |
| 2018/0138517 A1 | 5/2018 | Swiegers et al. | |
| 2018/0363151 A1 | 12/2018 | Swiegers et al. | |
| 2018/0363154 A1 | 12/2018 | Swiegers et al. | |
| 2018/0371630 A1 | 12/2018 | Swiegers et al. | |
| 2019/0006695 A1 | 1/2019 | Swiegers et al. | |
| 2019/0027759 A1 | 1/2019 | Swiegers et al. | |
| 2019/0157685 A1 | 5/2019 | Swiegers et al. | |
| 2019/0256991 A1 | 8/2019 | Swiegers et al. | |

FOREIGN PATENT DOCUMENTS

| | | |
|---|---|---|
| CA | 2238738 C | 4/2010 |
| CN | 101906642 A | 12/2010 |
| DE | 29823321 U1 | 8/1999 |
| EP | 0014596 B1 | 9/1983 |
| EP | 0047792 B1 | 12/1988 |
| EP | 0144002 B1 | 1/1989 |
| EP | 0580072 A1 | 1/1994 |
| EP | 1843415 A1 | 10/2007 |
| EP | 1985727 A1 | 10/2008 |
| EP | 1658652 B1 | 1/2011 |
| EP | 1337690 B1 | 4/2011 |
| FR | 2877731 B1 | 1/2007 |
| GB | 679334 A | 9/1952 |
| GB | 957168 A | 5/1964 |
| GB | 1267619 A | 3/1972 |
| GB | 1367810 A | 9/1974 |
| GB | 1387794 A | 3/1975 |
| GB | 1542690 A | 3/1979 |
| JP | S5375173 A | 7/1978 |
| JP | S5687684 A | 7/1981 |
| JP | S58516 B2 | 1/1983 |
| JP | H05198319 A | 8/1993 |
| JP | H05266932 A | 10/1993 |
| JP | H0737559 A | 2/1995 |
| JP | H0754181 A | 2/1995 |
| JP | H07211323 A | 8/1995 |
| JP | H07258877 A | 10/1995 |
| JP | H081165 A | 1/1996 |
| JP | H08264186 A | 10/1996 |
| JP | H08325772 A | 12/1996 |
| JP | H1142481 A | 2/1999 |
| JP | 3051893 B2 | 6/2000 |
| JP | 3072333 B2 | 7/2000 |
| JP | 3122734 B2 | 1/2001 |
| JP | 3324943 B2 | 9/2002 |
| JP | 2004225148 A | 8/2004 |
| JP | 2004250736 A | 9/2004 |
| JP | 2004292284 A | 10/2004 |
| JP | 2007526948 A | 9/2007 |
| JP | 2012036413 A | 2/2012 |
| JP | 2012041578 | 3/2012 |
| JP | 5040097 B2 | 10/2012 |
| RU | 93804 U1 | 5/2010 |
| WO | WO 1981/000032 A1 | 1/1981 |
| WO | WO 2000/034184 | 6/2000 |
| WO | WO 2000/044057 A1 | 7/2000 |
| WO | WO 2001/066362 A1 | 9/2001 |
| WO | WO 2001/071842 A2 | 9/2001 |
| WO | WO 2001/085635 | 11/2001 |
| WO | WO 2002/014224 A1 | 2/2002 |
| WO | WO 2002/025324 A1 | 3/2002 |
| WO | WO 2002/038833 A1 | 5/2002 |
| WO | WO 2003/042430 A2 | 5/2003 |
| WO | WO 2003/047011 A2 | 6/2003 |
| WO | WO 2004/003645 A1 | 1/2004 |
| WO | WO 2004/076721 A2 | 9/2004 |
| WO | WO 2007/002989 A1 | 1/2007 |
| WO | WO 2008/036962 A2 | 3/2008 |
| WO | WO 2009/015127 A1 | 1/2009 |
| WO | WO 2011/089904 A1 | 7/2011 |
| WO | WO 2011/094295 A1 | 8/2011 |
| WO | WO 2011/146558 A1 | 11/2011 |
| WO | WO 2012/023535 | 2/2012 |
| WO | WO 2012/075546 A1 | 6/2012 |
| WO | WO 2012/122600 A1 | 9/2012 |
| WO | WO 2013/037902 A2 | 3/2013 |
| WO | WO 2013/066331 A2 | 5/2013 |
| WO | WO 2013/185163 | 12/2013 |
| WO | WO 2013/185169 A1 | 12/2013 |
| WO | WO 2013/185170 A1 | 12/2013 |
| WO | WO 2014/082170 A1 | 6/2014 |
| WO | WO 2014/088628 A1 | 6/2014 |
| WO | WO 2015/013764 A1 | 2/2015 |
| WO | WO 2015/013765 A1 | 2/2015 |
| WO | WO 2015/013766 A1 | 2/2015 |
| WO | WO 2015/013767 A1 | 2/2015 |
| WO | WO 2015/085363 A1 | 6/2015 |
| WO | WO 2015/085364 A1 | 6/2015 |
| WO | WO 2015/085369 A1 | 6/2015 |
| WO | WO 2017/100841 A1 | 6/2017 |
| WO | WO 2017/100842 A1 | 6/2017 |
| WO | WO 2017/100845 A1 | 6/2017 |
| WO | WO 2017/100846 A1 | 6/2017 |
| WO | WO 2018/213889 A1 | 11/2018 |
| WO | WO 2018/213891 A1 | 11/2018 |

OTHER PUBLICATIONS

International Search Report and Written Opinion of the ISA/AU for PCT/AU2012/000668 dated Jul. 17, 2012, 11 pages.

(56) References Cited

OTHER PUBLICATIONS

Ioroi et al., Influence of PTFE coating on gas diffusion backing for unitized regenerative polymer electrolyte fuel cells, Journal of Power Sources 124 (2003), pp. 385-389.
Jang et al., Effect of water electrolysis catalysts on carbon corrosion in polymer electrolyte membrane fuel cells, J. Am. Chem. Soc. (2010), 132, 14700-701.
Jiang et al., A planar microfabricated electrolyzer for hydrogen and oxygen generation, Journal of Power Sources 188 (2009), pp. 256-260.
Kato et al., Highly efficient water splitting into H2 and O2 over lanthanum-doped NaTaO3 photocatalysts with high crystallinity and surface nanostructure, J. Am. Chem. Soc. (2003), 125, 3082-3089.
Kudo et al., Heterogeneous photocatalyst materials for water splitting, Chem. Soc. Rev., 2009, 38, pp. 253-278.
Marangio et al., Concept of a high pressure PEM electrolyser prototype, International Journal of Hydrogen Energy 36 (2011), pp. 7807-7815.
Marini et al., Advanced alkaline water electrolysis, Elsevier Ltd. (2012), pp. 384-391.
Mohapatra et al., Design of a highly efficient photoelectric cell for hydrogen generation by water splitting: application of TiO2-xCx nanotubes as a photoanode and Pt/TiO2 nanotubes as a cathode, J. Phys. Chem. C2007, 111, pp. 8677-8685.
Nieminen et al., Comparative performance analysis of PEM and solid oxide steam electrolysers, International Journal of Hydrogen Energy 35 (2010), pp. 10842-10850.
Osterloh, Inorganic materials as catalysts for photochemical splitting of water, Chem. Mater. 2008, 20, pp. 35-54.
Pletcher et al., Prospects for alkaline zero gap water electrolysers for hydrogen production, International Journal of Hydrogen Energy 36 (2011), pp. 15089-15104.
Tributsch, Photovoltaic hydrogen generation, International Journal of Hydrogen Energy 33 (2008), pp. 5911-5930.
USPTO, Non-Final Office Action dated Mar. 23, 2017 in U.S. Appl. No. 14/407,014, 9 pages.
USPTO, Final Office Action dated Aug. 17, 2017 in U.S. Appl. No. 14/407,014, 9 pages.
Winther-Jensen et al., High rates of oxygen reduction over a vapor phase-polymerized PEDOT electrode, Science 321, Aug. 2008, pp. 671-674.
Winther-Jensen et al. (2012) "Towards hydrogen production using a breathable electrode structure to directly separate gases in the water splitting reaction," Elsevier Ltd., International Journal of Hydrogen Energy 37: 8185-8189.
Yin et al., Enhanced solar water-splitting efficiency using core/sheath heterostructure CdS/TiO2 nanotube arrays, Nanotechnology 18 (2007) 495608, pp. 1-6.
Zeng et al., Recent progress in alkaline water electrolysis for hydrogen production and applications, Progress in Energy and Combustion Science 36 (2010, pp. 307-326.
Bolwin et al. (1995) "Preparation of porous electrodes and laminated electrode-membrane structures for polymer electrolyte fuel cells (PEFC)," Solid State Ionics 77: 324-330.
Brimblecombe et al. (2010) "A tandem water-splitting devise based on a bio-inspired manganese catalyst," Chemistry and Sustainability 3:1146-1150.
Brimblecombe et al. (2010) "Solar driven water oxidation by a bioinspired manganese molecular catalyst," J Am Chem Soc. 132(9):2892-2894.
Brussieux et al. (2011) "Controlled Electorchemical Gas Bubble Release from Electrodes Entirely and Partially Covered with Hydrophobic Materials," Electrochemica Acta 56: 7194-7201.

De Gregorio et al. (2005) "A PTFE membrane for the in situ extraction of dissolved gases in natural waters: Theory and applications," Geochemistry Geophysics Geosystems 6(9): 1-13.
Extended European Search Report, dated Jul. 22, 2019, corresponding to European Application No. 16874136.1 (filed Dec. 14, 2016), related to the present application, 6 pp.
Gillespie et al. (2015) "Performance evaluation of a membraneless divergent electrode-flow-through (DEFT) alkaline electrolyser based on optimisation of electrolytic flow and electrode gap," Journal of Power Sources 293: 228-235.
Guo et al. (2009) "Chemical power sources battery principle and manufacturing technology," Central South University Press, 1st ed: 8 pp.
International Search Report and Written Opinion of the ISA/AU for PCT/AU2013/000616 dated Jul. 10, 2013, 10 pages.
Kadyk et al. (Dec. 2016) "How to Enhance Gas Removal from Porous Electrodes?," Scientific Reports 6: 1-14.
Maxwell (2012) "Passive Gas-Liquid Sepration Using Hydrophobic Porous Polymer Membranes: A study on the Effect of Operating Pressure on Membrane Area Requirement," Univ. North Florida Graduate Thesis, 63 pp.
Notice of Allowance and Fee(s) Due, dated May 24, 2019, corresponding to U.S. Appl. No. 15/468,770, 7 pp.
Office Action issued by the Mexican Patent Office regarding related Mexican Patent Application No. MX/E/2017/048895, dated Oct. 16, 2017, 3 pages.
PCT International Search Report and Written Opinion dated Mar. 2, 2017 for PCT/AU2016/051234, 8 pp.
Search Report issued in European Application No. EP 16184214 dated Oct. 26, 2016 (5 pages).
U.S. Patent Office, Office Action dated Oct. 27, 2017 | U.S. Appl. No. 14/406,797, 9 pages.
U.S. Office Action, dated Jul. 16, 2019, corresponding to U.S. Appl. No. 15/850,279, 4 pp.
Vermeiren et al. (2009) "Electrode diaphragm electrode assembly for alkaline water electrolysers," Int'l Journal of Hydrogen Energy 34: 9305-9315.
Wagner et al. (publicly available Dec. 2017) "An Electrochemical Cell with Gortex-based Electrodes Capable of Extracting Pure Hydrogen from Highly Dilute Hydrogen-Methan Mixtures," Energy Environ. Sci. 11: 172-184 (published 2018).
Winther-Jensen et al. (2010) "Conducting Polymer Composite Materials for Hydrogen Generation," Advanced Materials 22: 1727-1730.
U.S. Appl. No. 13/992,983, filed Oct. 28, 2013.
U.S. Appl. No. 14/406,797, filed Mar. 2, 2015.
U.S. Appl. No. 14/407,014, filed Dec. 10, 2014.
U.S. Appl. No. 14/564,910, filed Dec. 9, 2014.
U.S. Appl. No. 14/908,258, filed Jan. 28, 2016.
U.S. Appl. No. 14/908,334, filed Jan. 28, 2016.
U.S. Appl. No. 14/908,352, filed Jan. 28, 2016.
U.S. Appl. No. 14/908,444, filed Jan. 28, 2016.
U.S. Appl. No. 15/103,026, filed Jun. 9, 2016.
U.S. Appl. No. 15/103,042, filed Jun. 9, 2016.
U.S. Appl. No. 15/103,052, filed Jun. 9, 2016.
U.S. Appl. No. 15/468,770, filed Mar. 24, 2017.
U.S. Appl. No. 15/638,780, filed Jun. 30, 2017.
U.S. Appl. No. 15/850,279, filed Dec. 21, 2017.
U.S. Appl. No. 16/010,842, filed Jun. 18, 2018.
U.S. Appl. No. 16/061,975, filed Jun. 13, 2018.
U.S. Appl. No. 16/061,910, filed Jun. 13, 2018.
U.S. Appl. No. 16/062,019, filed Jun. 13, 2018.
U.S. Appl. No. 16/062,063, filed Jun. 13, 2018.
U.S. Appl. No. 16/198,477, filed Nov. 21, 2018.
U.S. Appl. No. 16/259,632, filed Jan. 28, 2019.
U.S. Appl. No. 14/406,797, filed Mar. 9, 2015.

* cited by examiner

BREATHABLE ELECTRODE STRUCTURE AND METHOD FOR USE IN WATER SPLITTING

CROSS-REFERENCE TO RELATED APPLICATIONS

This application is a continuation of U.S. patent application Ser. No. 14/406,797, which is a United States national phase of international patent application No. PCT/AU2012/000668, filed Jun. 12, 2012, the entire disclosures of which are hereby incorporated herein by reference.

FIELD OF INVENTION

The present invention relates to the field of electrochemistry, particularly electrodes and electrolytic reactions.

In one form, the invention relates to a novel electrode.

In one particular aspect the present invention is suitable for use in water splitting processes.

In another particular aspect the present invention there is provided a method for directly separating gases in an electrolytic reaction such as water splitting.

In another aspect of the present invention there is provided a water splitting device.

It will be convenient to hereinafter describe the invention in relation to water splitting, however it should be appreciated that the invention is not limited to that use only.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

The overall reaction of water splitting, $2H_2O \rightarrow 2H_2 + O_2$, produces $O_2$ and $H_2$ gases as end products. These gases need to be kept separate for later individual use and to avoid production of an explosive gas mixture (Tributsch H. Photovoltaic hydrogen generation *Int J Hydrogen Energy* 2008; 33:5911-30). There are several approaches to the design of devices that can maintain separation of the two gases during electrolysis, for example the use of a membrane to separate the electrode compartments. This also minimizes cross-over of dissolved gases from one electrode to be recycled at other electrode (Ioroi T, Oku T, Yasuda K, Kumagai N, Miyazaki Y. Influence of PTFE coating on gas diffusion backing for unitized regenerative polymer electrolyte fuel cells. *J Power Sources* 2003; 124:385-9; and Marangio F, Pagani M, Santarelli M, Cali M, Concept of a high pressure PEM electrolyser prototype. *Int J Hydrogen Energy* 2011; 36:7807-15.

Although the gases can be separated, new issues arise with these technologies e.g. cost, mechanical properties, high resistance through the membrane and ultra pure water is needed for proper operation (Nieminen J, Dincer I, Naterer G. Comparative performance analysis of PEM and solid oxide steam electrolysers. *Int J Hydrogen Energy* 2010; 35:10842-50). Alkaline zero gap electrolysers using $OH^-$ conducting membranes are also being considered (Pletcher D, Li X. Prospects for alkaline zero gap water electrolysers for hydrogen production. *Int J Hydrogen Energy* 2011; 36:15089-104).

In the traditional alkaline electrolyser, where a diaphragm is the only separator, bubble formation inside and between the electrode and the separator is the major cause of transport resistance. A number of suggestions on bubble management have been made e.g. use of mechanical circulation of the electrolyte, use of (stable) additives to reduce surface tension of the electrolyte so the bubble can leave the system easier and modification of the electrode surface properties to be less attractive to the gas bubbles (Zeng K, Zhang D. Recent progress in alkaline water electrolysis for hydrogen production and applications. *Prog Energy Combust Sci* 2010; 36:307-26.)

One of the features of the $O_2$ evolution reaction is that the dissolved oxygen concentration at the electrode has to build up to a level sufficient to nucleate and form small, high-pressure bubbles. According to Laplace's equation: $P = 2\gamma/r$, where P is pressure in the bubble, $\gamma$ is the surface tension and r the radius of the bubble, near the surface of an electrolyte, $O_2$ bubbles with 0.1 μm radius need to have a pressure of 14 atm at 25° C. The concentrations required not only produce overpotential at the electrode (and thus inefficiencies in water splitting), but also represent a very reactive environment that challenges the long term stability of many catalysts.

Several reports have described efforts to improve water splitting cell efficiency by addition of sacrificial agents or co-catalysts, modification of catalyst crystal structures and morphology, and specific surface area (Kudo A, Miseki Y. Heterogeneous photocatalyst materials for water splitting. *Chem Soc Rev* 2009; 38:253-78; Kato H, Asakura K, Kudo A. Highly efficient water splitting into $H_2$ and $O_2$ over lanthanum-doped $NaTaO_3$ photocatalysts with high crystallinity and surface nanostructure. *J Am Chem Soc* 2003; 125:3082-9; and Osterloh F E. Inorganic materials as catalysts for photochemical splitting of water. *Chem Mater* 2008; 20:35-54.)

A few reports have designed novel electrode architectures at the nano- or micro-scopic scales to enhance cell performance (Mohapatra S K, Misra M, Mahajan V K, Raja K S. Design of a highly efficient photoelectrolytic cell for hydrogen generation by water splitting: Application of $TiO_2$-xCx nanotubes as a photoanode and $Pt/TiO_2$ nanotubes as a cathode. *J Phys Chem C* 2007; 111:8677-85; and Yin Y, Jin Z, Hou F. Enhanced solar water-splitting efficiency using core/sheath heterostructure $CdS/TiO_2$ nanotube arrays. *Nanotechnology* 2007; 18).

Also, there have been attempts to separate the gases using different flow streams of the electrolyte in a planar microfabricated device, but the device efficiency was not high (Jiang L, Myer B, Tellefsen K, Pau S. A planar microfabricated electrolyzer for hydrogen and oxygen generation. *J Power Sources* 2009; 188:256-60). It appears that improvements, based on modification of the electrode structure, to rapidly remove the $O_2$ from the cell before the bubble is formed, has not yet been widely considered. The traditional gas diffusion electrodes (GDE) of the type used in fuel cells have a tendency to continue to form $O_2$ bubbles when operating in water splitting devices (Ioroi T, Oku T, Yasuda K, Kumagai N, Miyazaki Y. Influence of PTFE coating on gas diffusion backing for unitized regenerative polymer electrolyte fuel cells. *J Power Sources* 2003; 124:385-9).

Moreover, these electrodes are not stable under water oxidation (WO) condition, the carbon being rapidly oxidized at the potentials involved in WO (Chaparro A M, Mueller N, Atienza C, Daza L. Study of electrochemical instabilities of PEMFC electrodes in aqueous solution by means of membrane inlet mass spectrometry. *J Electroanal Chem* 2006; 591:69-73; and Jang S E, Kim H. Effect of water electrolysis catalysts on carbon corrosion in polymer electrolyte membrane fuel cells. *J Am Chem Soc* 2010; 132:14700-1.)

In other prior art work a hydrophobic gas porous membrane (Goretex®) has been used to develop an efficient three phase-interface structure for an air-electrode (Winther-Jensen B, Winther-Jensen O, Forsyth M, MacFarlane DR. High rates of oxygen reduction over a vapour phase-polymerized PEDOT electrode. *Science* 2008; 321:671-4). The advantage of this, as a substrate for an electrode, is that gas can diffuse through the membrane, but liquid water cannot, and that an efficient three-phase interface can be maintained during operation. The fact that the cell responds linearly to the $O_2$ content in the supplied gas in the $O_2$ reduction reaction clearly proved that efficient gas transportation through the electrode was achieved.

SUMMARY OF INVENTION

An object of the present invention is to provide a device, method and process for the use of a hydrophobic membrane for electrolysis to directly separate the evolved gases from the electrolyte solution.

Another object is to improve the efficiency of electrolytic reactions such as water splitting.

A further object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided a water splitting cell having at least one electrode comprising a porous membrane, wherein gas produced at the at least one electrode diffuses out of the cell via the porous membrane.

The removal of produced gas across the porous membrane results in a device capable of separating the gas from the reaction at the electrode. Note that the porous membrane may also be a porous gas permeable membrane, if the appropriate phase interface can be established. Greater than 90% of the gas produced at the at least one electrode can be removed from the cell across the porous membrane. Desirably, and greater than 95% and greater than 99% of the gas produced can be removed across the porous membrane.

The removal of gas from the reaction at the electrode without substantial bubble formation permits the water splitting reaction to be achieved with a substantially lower over potential, thereby increasing the efficiency of the water splitting cell.

By the term "without substantial bubble formation" it will be understood that we mean without substantial formation of bubbles visible to the naked eye. All bubbles are "formed" very small and then grow as this is the preferred state because it lowers the pressure in the bubble (according to Laplace's equation: $P=2\gamma/r$, where P is pressure in the bubble, $\gamma$ is the surface tension and r the radius of the bubble). Small bubbles can easily fuse to form bigger ones, thus leading to a range of bubble sizes. The water splitting cell may be capable of operating without the substantial formation of gas bubbles greater than 125 µm in diameter. In some embodiments, the water splitting cell is capable of operating without the substantial formation of bubbles greater than 100 µm in diameter and without the formation of bubbles greater than 50 µm in diameter. The water splitting cell may, in particular embodiments permit operation without the formation of gas bubbles. Separating the gas from the active area of the electrode without substantial bubble formation facilitates the efficient operation of the water splitting cell.

In a second aspect of embodiments described herein there is provided a water splitting cell having a cathode comprising a porous membrane, wherein $H_2$ gas produced at the cathode diffuses out of the cell via the porous membrane, separating the $H_2$ gas from the cathodic reaction without bubble formation.

In a third aspect of embodiments described herein there is provided a water splitting cell having an anode comprising a porous membrane, wherein $O_2$ gas produced at the anode diffuses out of the cell via the porous membrane, separating the $O_2$ gas from the anodic reaction without bubble formation.

In a fourth aspect of embodiments described herein there is provided a water splitting cell having:
  a cathode comprising a first porous membrane,
  an anode comprising a second porous membrane,
  at least one electrolyte for immersion of the anode and the cathode,
wherein gas is produced at the electrodes without bubble formation and diffuses out of the cell via the porous membranes.

In a fifth aspect of embodiments described herein there is provided an electrode for water splitting comprising a porous membrane associated with a model catalyst.

In a sixth aspect of embodiments described herein there is provided a water splitting device according to the present invention comprising a porous membrane associated with a model catalyst.

This catalyst may be chosen from known catalysts according to the reaction occurring on the electrode. Generally precious metals such as platinum, gold and palladium can be used. Further, suitable catalysts for water oxidation include: rare elements such as Ru and Ir complexes, Mn complexes which have been studied extensively as models of the oxygen-evolution-catalyst (OEC) but none of them is a pure photo-catalyst, and abundant metals complexes such as Fe, $NiO_x$ and Co (See for example, X. Liu, F. Wang, Transition metal complexes that catalyze oxygen formation from water: 1979-2010, Coordination Chemistry Reviews 256 (2012) 1115-1136; P. Du, R. Eisenberg, Catalysts made of earth-abundant elements (Co, Ni, Fe) for water splitting: Recent progress and future challenges, Energy and Environmental Science 5 (2012) 6012-6021; and M. W. Kanan, D. G. Nocera, In situ formation of an oxygen-evolving catalyst in neutral water containing phosphate and $Co^{2+}$, Science 321 (2008) 1072-1075.

For increasing stability, such metal-oxide catalysts may be containing an additional element such as phosphorous. For water reduction, conducting polymers such as poly(3, 4-ethylenedioxythiophene) and polypyrrole, Co, Ni, a few Fe complexes and $MoS_x$ have been reported as catalysts for water reduction reaction. (P. Du, R. Eisenberg, Catalysts made of earth-abundant elements (Co, Ni, Fe) for water splitting: Recent progress and future challenges, Energy and Environmental Science 5 (2012) 6012-6021; B. Winther-Jensen, K. Fraser, C. Ong, M. Forsyth, D. R. MacFarlane, Conducting polymer composite materials for hydrogen generation, Advanced Materials 22 (2010) 1727-1730; J. Chen, J. Huang, G. F. Swiegers, C. O. Too, G. G. Wallace, A readily-prepared electrocatalytic coating that is more active than platinum for hydrogen generation in 1 M strong acid, Chemical Communications 10 (2004) 308-309; Y. Hou, B. L. Abrams, P. C. K. Vesborg, M. E. Bjorrketun, K. Herbst, L. Bech, A. M. Setti, C. D. Damsgaard, T. Pedersen, O. Hansen, J. Rossmeisl, S. Dahl, J. K. Norskov, I. Chorkendorff, Bioinspired molecular co-catalysts bonded to a silicon photocathode for solar hydrogen evolution, Nature Materials 10 (2011) 434-438.) The choice of catalyst will depend on operating conditions such as temperature, salinity and pH of the electrolyte.

In another embodiment the catalyst is platinum deposited on the porous membrane.

The cell of the present invention not only separates the gases and decreases gas cross-over in the cell, but also facilitates a more favourable environment for the operation of the catalyst. In general, increasing partial pressure of $O_2$ in an electrolytic cell causes increasing degradation of the catalyst, particularly the anode catalyst. Hence the removal of $O_2$ according to the present invention reduces this effect, permitting the use of (photo) catalysts previously unsuitable such as CdS, CdSe, and GaAs.

In one embodiment, the catalyst is tuned to produce the gas (hydrogen or oxygen) at a rate that matches the flux across the membrane in order to enable complete or near complete withdrawal of the gases without substantial bubble formation.

It is desirable that the advancing contact angle of the porous membrane with the electrolyte is greater than 90°.

In another embodiment the porous membrane is a hydrophobic membrane. Suitable membranes may have various pore sizes and pore shapes and be manufactured from various hydrophobic materials. The membranes may have a pore size less than 0.5 µm, less than 0.1 µm or worse than 0.05 µm.

In another embodiment, the porous membrane may or may not be hydrophobic in nature but be coated with a thin film of hydrophobic material. Suitable hydrophobic material may be rather or silicone and enhance the wet ability of the porous membrane whilst still providing the requisite degree of breathability (having a sufficient flux of the gas across the membrane). Other suitable thin-film coatings may be selected from the group consisting of silicone-fluoropolymer, polydimethylsiloxane (PDMS) or its copolymers, PDD-TFE (perfluoro-2, 2-dimethyl-1, 3-dioxole with tetrafluoroethylene) and combinations thereof.

In another embodiment, the porous membrane comprises hydrophobic, conducting carbon material such as carbon fibre, graphene or carbon nanotubules.

The Young-Laplace equation defining the capillary pressure, Pc, can be used as guidance for selection of materials and pore size for the membrane. It states that the capillary pressure ($p_c$) is proportional to the surface tension ($\gamma$) and inversely proportional to the effective radius (r) of the interface, it also depends on the wetting contact angle (θ) of the liquid on the surface of the capillary.

$$p_c = \frac{2\gamma\cos\theta}{r}$$

As the contact angle approach 90° the capillary pressure goes towards zero (and eventually changes sign) resulting in wetting of the membrane. This is theoretically limiting possible membrane materials to those with a contact angle above 90°. Table 1 lists average surface tension and water contact angles for common hydrophobic polymers. It should be taken into account that the production method and material grade can result in some variation in contact angle. For example, for polystyrene contact angles up to 98° has been reported whereas the average is below 90°. It will be apparent to those skilled in the that only the part of the membrane that is in direct contact with water needs to have the needed high contact angle and that this can be obtained for example, by coating one side of a (hydrophilic) membrane with one of the polymers from the list below. Some carbon materials (e.g. carbon fibre) have a contact angle higher than 90° and may therefore be used directly as a conducting hydrophobic membrane. However, adequate catalysts will have to be coated onto these carbon materials.

TABLE 1

| Polymer Name | Surface Tension ($\gamma$) mJ/m² | Contact Angle |
|---|---|---|
| Polyvinyl fluoride (PVF) | 32.7 | 84.5 |
| Polyvinyl chloride (PVC) | 37.9 | 85.6 |
| Nylon 8,8 | 34 | 86 |
| Nylon 9,9 | 34 | 86 |
| Polystyrene (PS) | 34 | 87.4 |
| Polyvinylidene fluoride (PVDF) | 31.6 | 89 |
| Poly n-butyl methacrylate (PnBMA) | 29.8 | 91 |
| Polytrifluoroethylene | 26.5 | 92 |
| Nylon 10,10 | 32 | 94 |
| Polybutadiene | 29.3 | 96 |
| Polyethylene (PE) | 31.6 | 96 |
| Polychlorotrifluoroethylene (PCTFE) | 30.8 | 99.3 |
| Polypropylene (PP) | 30.5 | 102.1 |
| Polydimethylsiloxane (PDMS) | 20.1 | 107.2 |
| Poly t-butyl methacrylate (PtBMA) | 18.1 | 108.1 |
| Fluorinated ethylene propylene (FEP) | 19.1 | 108.5 |
| Hexatriacontane | 20.6 | 108.5 |
| Paraffin | 24.8 | 108.9 |
| Polytetrafluoroethylene (PTFE) | 19.4 | 109.2 |
| Poly(hexafluoropropylene) | 16.9 | 112 |
| Polyisobutylene (PIB, butyl rubber) | 27 | 112.1 |

For example, with reference to the Young-Laplace equation above, for a polytetrafluoroethylene (PTFE) membrane in contact with liquid water, the contact angles are typically 100-115° (http://www.accudynetest.com/polymer_surface_data/ptfe.pdf). The surface tension of water is typically 0.07197 N/m at 25° C. (http://en.wikipedia.orq/wiki/Surface_tension). If the water contains an electrolyte such as 1 M KOH, then the surface tension of the water typically increases to 0.07480 N/m (according to the scientific paper entitled "Surface tension of aqueous electrolyte solutions at high concentrations—representation and prediction" in *Chemical and Engineering Science*, Volume 56 (2001), pages 2879-2888, by authors Zhibao Li and Benjamin C.-Y. Lu). Applying these parameters to the Washburn equation yields the following data:

| Pore size of membrane, micrometers | Contact Angle of the liquid with the membrane, degrees | Pressure to wet/dewet pore, Pa (N/m2) | Pressure to wet/dewet pore, Pa (bar) | Pressure to wet/dewet pore, Pa (psi) |
|---|---|---|---|---|
| 10 | 115 | 6322 | 0.06 | 0.9 |
| 5 | 115 | 12645 | 0.13 | 1.8 |
| 1 | 115 | 63224 | 0.63 | 9.2 |
| 0.5 | 115 | 126447 | 1.26 | 18.3 |
| 0.3 | 115 | 210746 | 2.11 | 30.6 |
| 0.1 | 115 | 632237 | 6.32 | 91.7 |
| 0.05 | 115 | 1264474 | 12.64 | 183.3 |

-continued

| Pore size of membrane, micrometers | Contact Angle of the liquid with the membrane, degrees | Pressure to wet/dewet pore, Pa (N/m2) | Pressure to wet/dewet pore, Pa (bar) | Pressure to wet/dewet pore, Pa (psi) |
|---|---|---|---|---|
| 0.025 | 115 | 2528948 | 25.29 | 366.7 |
| 0.013 | 115 | 4863361 | 48.63 | 705.2 |
| 0.01 | 115 | 6322369 | 63.22 | 916.7 |
| 10 | 100 | 2598 | 0.03 | 0.4 |
| 5 | 100 | 5196 | 0.05 | 0.8 |
| 1 | 100 | 25978 | 0.26 | 3.8 |
| 0.5 | 100 | 51956 | 0.52 | 7.5 |
| 0.3 | 100 | 86593 | 0.87 | 12.6 |
| 0.1 | 100 | 259778 | 2.60 | 37.7 |
| 0.05 | 100 | 519555 | 5.20 | 75.3 |
| 0.025 | 100 | 1039111 | 10.39 | 150.7 |
| 0.013 | 100 | 1998290 | 19.98 | 289.8 |
| 0.01 | 100 | 2597777 | 25.98 | 376.7 |

The calculated capillary pressure of the membranes tested and found to be suitable are ranging from −2500 Pa (Mitex (PTFE)) to −132000 Pa (Celgard 880 (PE)) and thereby underlining the large design freedom for the choice of membranes. The negative sign of the pressure values indicates that the capillary pressure is directed out of the pore and thereby preventing flooding of the membrane. These pressure values corresponds well with measurements obtained from PTFE coated carbon paper membranes ("Capillary pressures in carbon paper gas diffusion layers having hydrophilic and hydrophobic pores" Liang Hao, Ping Cheng, International Journal of Heat and Mass Transfer 55 (2012) 133-139). In an embodiment the capillary pressure of the membrane will be below −5000 Pa. For systems where water is dispersed or dissolved in a hydrophobic electrolytes the considerations regarding capillary pressure will still be valid, but in this case a hydrophilic membrane must be used to avoid solvent penetration into the membrane.

Combining the electrode of the present invention with catalysts and photocatalysts of various types e.g. non-precious metal and metal oxides allows greater scope for fabrication of cost efficient and straightforward water splitting electrolytic devices.

Other aspects and forms are disclosed in the specification and/or defined in the appended claims, forming a part of the description of the invention.

In essence, embodiments of the present invention stem from the realization that a breathable electrode structure can be used to directly separate gases in an electrolytic reaction.

Advantages provided by the water splitting cell and electrodes of the present invention comprise the following:
efficient removal of gases from the water splitting reaction with concomitant improvement in the efficiency of the system;
the direct separation of gases negates the need for a separator;
production of high purity gases;
reduces the potential for produced hydrogen to be oxidised at the anode and for produced oxygen to be reduced at the cathode;
provides a more favourable environment for the operation of the catalyst;
facilitates use of otherwise unsuitable catalysts that would be degraded as partial pressure of $O_2$ increases;
the direct separation of gases decreases gas cross over and thereby enhances columbic efficiency; and
the combination of the electrode with optimised catalysed and photocatalysts provides opportunities for fabrication of more cost efficient electrolytic devices Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which:

FIG. 1b illustrates gas and ion movements in an aqueous electrolyte 11 relative to the cathode 10 and anode 12 corresponding to the set-up shown in FIG. 1a.

EXAMPLES

The invention will be further described with reference to the following non-limiting examples. More specifically, three membrane electrodes with different morphology and pore sizes and shapes were prepared and studied. Platinum, the most well studied catalyst was used as the model catalyst material. However the electrodes of the present invention should not be interpreted as being limited to this catalyst and can be operated with many catalysts.

Membrane Treatment and Pt Coating

PTFE membranes (Goretex®) was obtained from Gore Inc and Mitex™ (10 μm) was obtained from Millipore. Au mylar (2.5 Ohm/square) was purchased from CPFilms Inc. Maleic anhydride was obtained from Sigma-Aldrich. Preparation of the Goretex®, Mitex™, polyethylene (PE) and polypropylene (PP) membranes prior to Pt coating was similar to previous work described by Winther-Jensen et al entitled 'High rates of oxygen reduction over a vapor phase-polymerized PEDOT electrode' in Science 2008; 321: 671-4. Maleic anhydride was grafted onto the hydrophobic surface of the membranes to ensure good bonding to the gold conducting layer, using plasma polymerisation as earlier reported in the aforementioned article and by Ademovic Z et al, in and article entitled 'Surface modification of PET films using pulsed AC plasma polymerisation aimed at preventing protein adsorption' in *Plasma Processes Polym* 2005; 2:53-63. The gold was sputtered onto the plasma treated membranes and its thickness was optimised to give a surface resistance ~5 Ohm/sq. The Pt was then sputtered on top of the gold layer at 28-30 mA for 60 sec. A traditional GDE was also studied for comparison; this was an ionomer free (LT-140EW-30% Pt on Vulcan XC-72, 0.5 mg cm$^{-2}$) from E-TEK and used as supplied. SEM images were obtained using a JEOL 7100F Field Emission Gun Scanning Electron Microscope at 5 kV.

Electrode Assembly

Figure 1A:
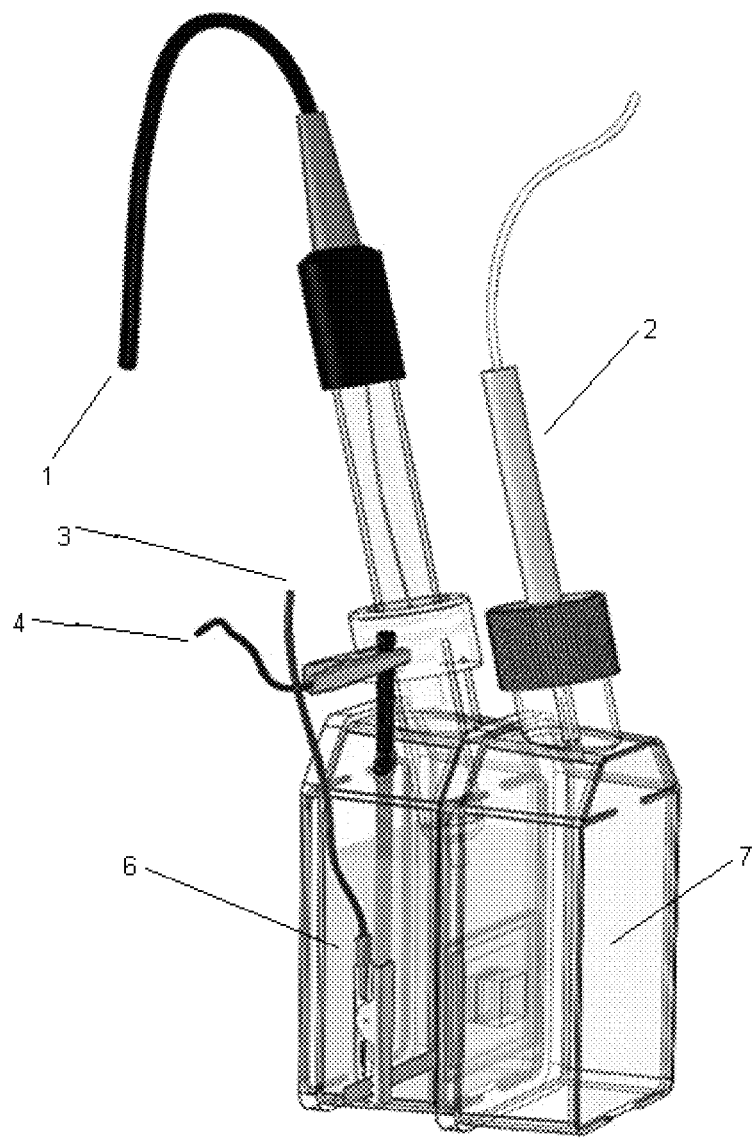
FIG. 1a is a schematic of the experimental set-up showing the reference electrode 1, anode 3, cathode 4, and oxygen probe 5 relative to the electrolysis chamber 6 on the left, attached to the gas collection chamber 7 on the right (half breathing cell)
Figure 1B:
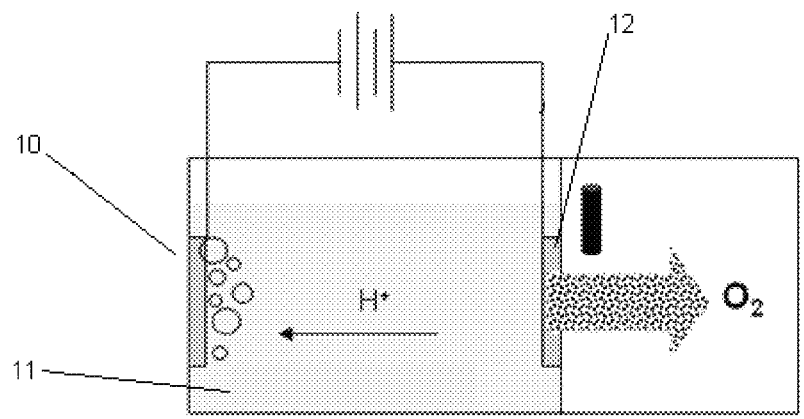
Figure 1C:
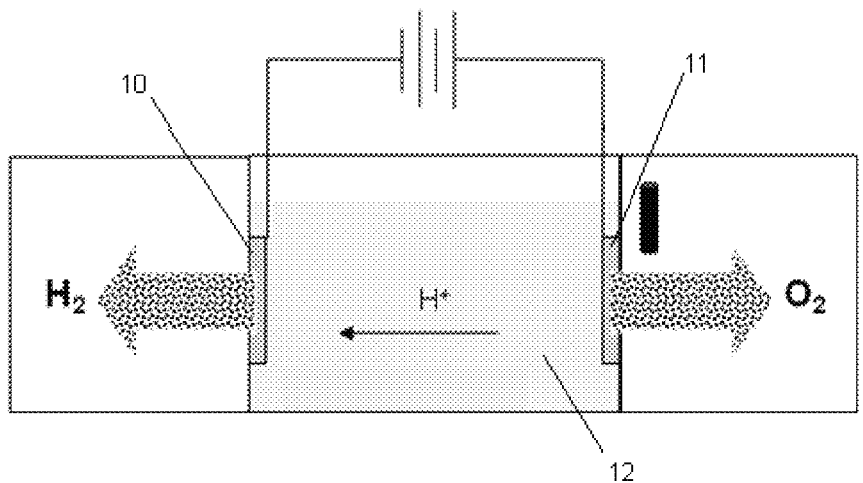
FIG. 1c illustrates gas and ion movements in a full breathing cell. The black rectangles in FIG. 1b and FIG. 1c indicated the Micro-Oxygen Electrode position.

The membrane was sandwiched with a gold strip using a conventional laminator. A 0.7 cm$^2$ window in the laminate allowed access for electrolyte to the Pt coated side of the membrane and for the gas to breathe out to the adjacent chamber when mounted on the test cell with double-sided adhesive tape (FIG. 1).

Experimental Set-Up and Gas Measurement

Sodium p-toluene sulphonate (from Sigma Aldrich) 0.05 M pH 4 was used as an electrolyte. 30 ml of electrolyte was used in the test cell leaving 30 ml gas space above the electrolyte. A three electrode cell was set-up using a saturated calomel reference electrode (SCE) and carbon rod or Pt counter electrode. A multi-channel potentiostat (VMP2 from Princeton Applied Research) was used for the constant-current electrolysis. The distance between the electrodes is 1.5 cm and the potential during operation of all working electrodes was typically ~2-2.4 V vs SCE.

The Micro-Oxygen Electrode was purchased from eDAQ and used to monitor $O_2$ evolution from the electrolysis reactions. It was calibrated at 21% $O_2$ in air and 0% $O_2$ in pure nitrogen gas. The slope from the calibration was 10.3 mV equals 1% $O_2$. The amount of $H_2$ was measured using gas chromatography (SRI 310C, MS-5A column, TCD, Ar carrier).

Results

Figure 2:
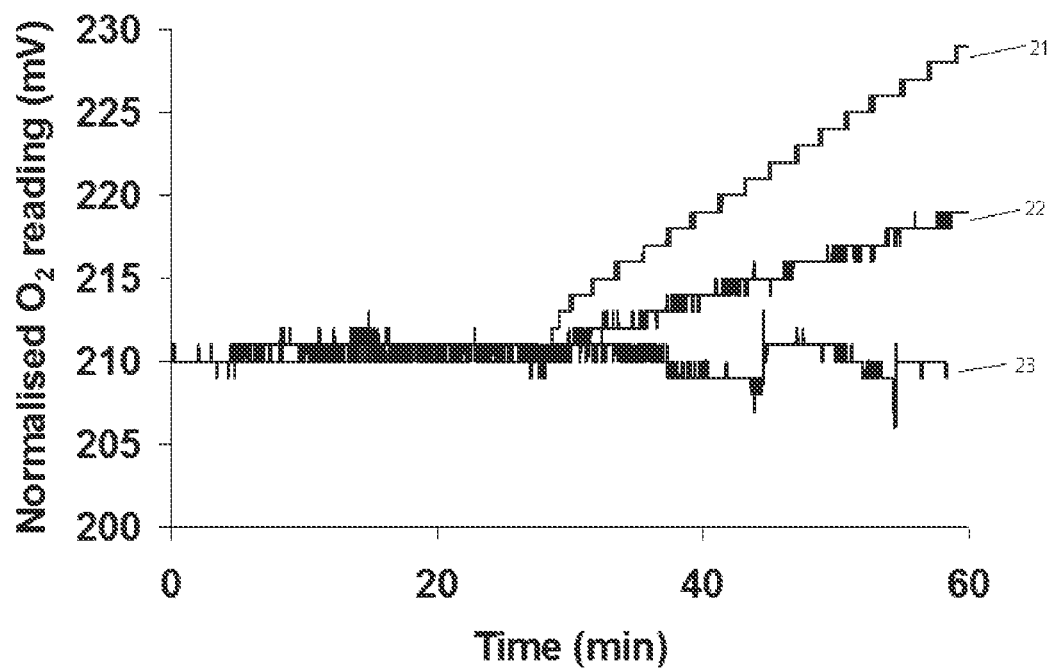
FIG. 2 illustrates $O_2$ measurement behind the different Pt-coated membranes (Au/Goretex® 21, Au/Mitex™ 10 µm 22 and GDE 23)

The test cell was set up as shown in Scheme 1. Firstly, the experiments were focused on WO. Pt coated membrane was used as the anode and the liberated $O_2$ was monitored using a Micro-Oxygen Electrode placed in the chamber (60 ml) on the back side of the membrane (Scheme 1). Several seconds after 10 mA current was applied to the cell, bubbles started to form on the counter electrode (carbon rod). On the anode side, bubbles were not observed on the working area when Goretex® membrane was used. This suggested that the major portion of the $O_2$ was able to escape to the back side of the membrane. Some bubble formation was observed on the working area when the other membranes were used. The $O_2$ content of the back side chamber steadily increased during electrolysis for both Pt-coated Au/Goretex® and Au/Mitex™ electrodes, but remained unchanged for the GDE (FIG. 2), suggesting no $O_2$ production in the latter case. The studies by Chaparro et al (Chaparro A M, Mueller N, Atienza C, Daza L. Study of electrochemical instabilities of PEMFC electrodes in aqueous solution by means of membrane inlet mass spectrometry. *J Electroanal Chem* 2006; 591:69-73) and Jang and Kim (Jang S E, Kim H. Effect of water electrolysis catalysts on carbon corrosion in polymer electrolyte membrane fuel cells. *J Am Chem Soc* 2010; 132:14700-1) support this observation with the GDE as they showed the electrochemical oxidation of carbon on the GDE in presence of water at oxidative potentials (Chaparro A M, Mueller N, Atienza C, Daza L. Study of electrochemical instabilities of PEMFC electrodes in aqueous solution by means of membrane inlet mass spectrometry. *J Electroanal Chem* 2006; 591:69-73; and Jang S E, Kim H. Effect of water electrolysis catalysts on carbon corrosion in polymer electrolyte membrane fuel cells. *J Am Chem Soc* 2010; 132:14700-1).

The $O_2$ evolution rate from the Pt-coated Au/Goretex® electrode was the highest, indicating that the coated Goretex® electrode is the most efficient in emitting gaseous $O_2$ from the WO reaction.

Figure 3:
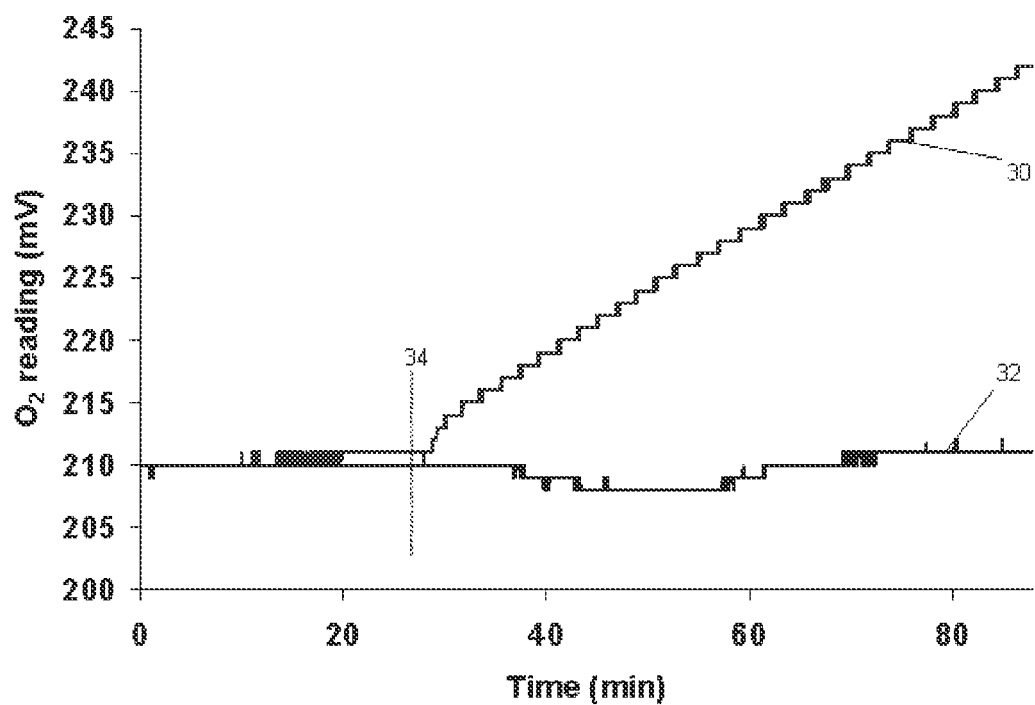
FIG. 3 illustrates $O_2$ measurements above the electrolyte ($O_2$ front 30) and behind the membrane in the adjacent chamber ($O_2$ back 32) after commencement of the application of 10 mA 34.

Further investigation was performed by monitoring the $O_2$ evolution in the head space above the electrolyte, in the front chamber, during water splitting with the Pt-coated Au/Goretex® electrode. The result (FIG. 3) showed no measurable increase in $O_2$ above the electrolyte, indicating a very high efficiency in removing it into the back chamber. The Faradaic efficiency in these experiments was 90±3%.

Figure 4:
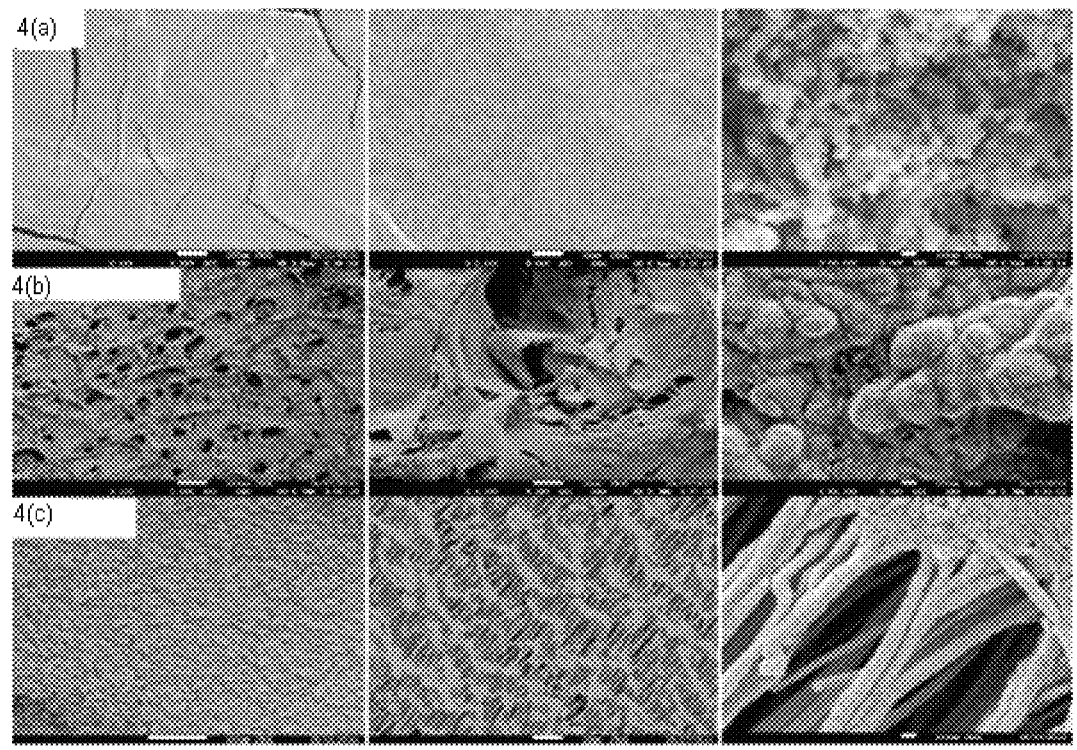
FIG. 4 is a series of scanning electron micrographs (SEM) of Pt-coated Au/Goretex® (FIG. 4(c)), Au/Mitex™ 10 µm (FIG. 4(b)) and GDE (FIG. 4(a)). (Scale bars: left column—100 µm, middle column—10 µm and right column—10 nm).

In order to understand the "breathing" ability of each membrane, scanning electron microscopy was performed as shown in FIG. 4.

As expected, Pt nanoparticles were well distributed on the membrane surfaces. The images of the GDE showed dense, packed structure with Pt nanoparticles ranging from 65 to 100 nm. The size of the sputtered Pt nanoparticles was in the range of 30-40 nm on Mitex™ and Goretex® membranes. The Mitex™ 10 μm images showed inconsistent pore size and distribution, whereas Goretex® has a fine pore size (~1×10 μm) with consistent distribution. The Goretex® structure is believed to contribute to its higher performance observed in the water splitting experiments.

As a control experiment, a non-porous substrate consisting of Pt-coated Au mylar was used as an anode in a single chamber set-up with the oxygen probe placed above the electrolyte. The $O_2$ produced in this experiment was much lower (0.48 μmol/min) than when using the Pt-coated Au/Goretex® (1.35 μmol/min) in the two chambers set-up. The Faradaic efficiency from this control experiment was only 31%. This indicates the degree of oxygen shuttling between the electrodes that are present in this cell configuration, having no separator, when a non-porous electrode is used.

In another experiment the Pt-coated Au mylar was used as the anode and Pt-coated Au/Goretex® as the cathode, ie as the $H_2$ producing electrode. There was no $H_2$ bubble formation observed on the cathode. The Faradaic efficiency of $O_2$ evolution in this experiment was 61%. When Pt-coated Au/Goretex® electrodes were used for both anode and cathode, so that both gases were removed from the cell, the Faradaic efficiency was increased to 92%. $H_2$ detected in this experiment was found to be close to 2:1 stoichiometric ratio within measurement error (±7%). This suggests that in an optimized cell and gas flow configuration it may be practical to avoid the use of a separator in these cells.

Figure 5:
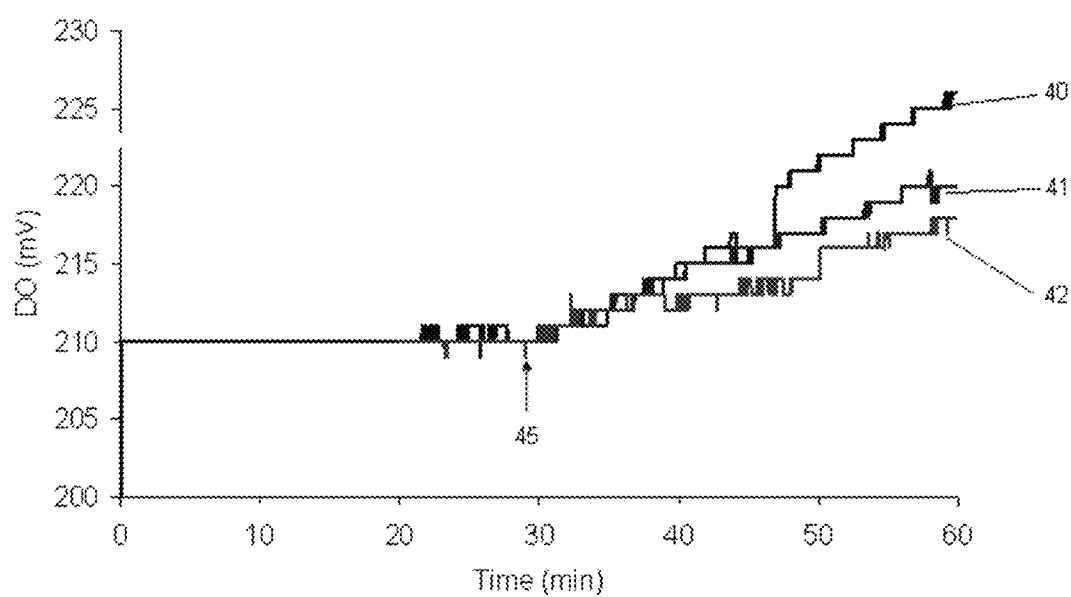
FIG. 5 illustrates $O_2$ measurement behind the different membranes coated with Pt: polyethylene Celgard 880 (40), polypropylene mesh (41) and non-woven polypropylene (42). 10 mA is applied where indicated (45).

Although Goretex® initially was found to be the best among the three membranes tested, certainly there are membranes with different hydrophobicity and various pore sizes and shapes which can be used. A number of these possibilities were tested in an additional experiment. Here polyethylene (PE, Celgard 880 (0.1×1μ poresize)) and polypropylene (PP) mesh (5μ poresize) and PP non-woven (5μ poresize) membranes were tested in similar way as described above (see FIG. 5). The Celgard 880 performed nearly as good as the Goretex® as seen from the increase in oxygen measured on the back chamber of the setup, which correspond to a faradaic efficiency of 82%. The two PP membranes were less efficient (51% and 41% respectively), however clearly showed that this material can be used for the membrane structure.

Stability Test of CdS on Ti/Au/Goretex and Baseline Test Using Ti/Au/Goretex.

Figure 6:
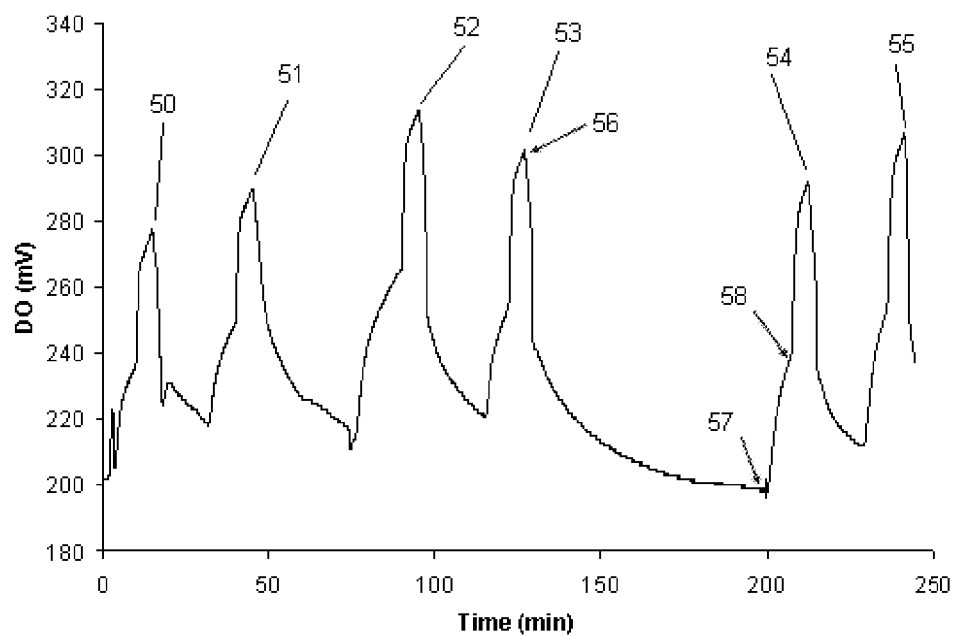
FIG. 6 is a plot of DO (mV) against time (min) illustrating $O_2$ evolution of the back chamber during shining of light and during evacuation using CdS/Ti/Au/Goretex. The peaks appearing in the graph correspond to 13 min ΔDO 42 mV (50), 13 min ΔDO 40 mV (51), 18 min ΔDO 49 mV (52), 12 min ΔDO 47 mV (53), 12 min ΔDO 52 mV (54) and 12 min ΔDO 53 mV (55). Measurements were taken with light off and $N_2$ and $O_2$ admitted to the chamber (56), with the light on and $N_2$ out (57) then $O_2$ out (58)

CdS/Ti/Au/Goretex or Ti/Au/Goretex (0.5 cm$^2$) was laminated and sandwiched between two plastic bottles. The front chamber was filled up with 0.05 M NaPTS pH 6.75 30 ml. An oxygen sensor was placed in the gas chamber. Black cloth was used to cover the plastic chamber to protect the light directly shining on the DO probe. Asahi lamp was used to shine the light on the sample. Each data point was collected after the following procedure: $N_2$ gas was used to purged the electrolyte for about 15 min or until stable baseline was achieved and in the same time $O_2$ was flushed into the back chamber, immediately after removal of $N_2$ (and the hole was sealed) the light was shone on the sample for 7 min, $O_2$ was then removed (and the hole was sealed) with the light continued to shine for another 5 min. This process has been repeated for 39 cycles. The $O_2$ increased was monitored and typical graph was shown in FIG. 6.

Figure 7:
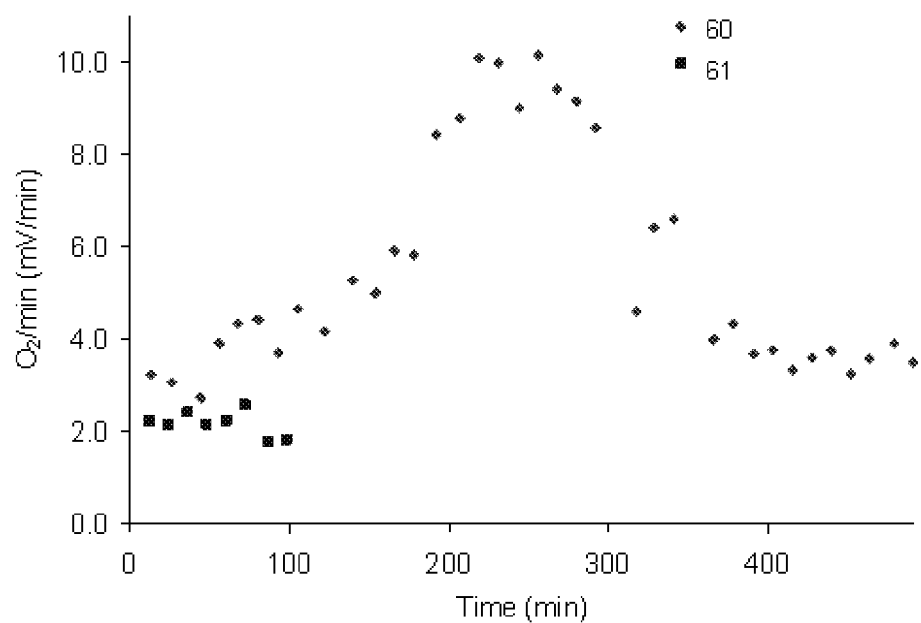
FIG. 7 is a plot of $O_2$ evolution rate over light exposed time (min) for CdS/Ti/Au/Goretex membrane (60) and Ti/Au/Gortex membrane (61).

The data was then plotted as the rate of $O_2$ increased (increased in $O_2$ reading over, typically, 12 min light exposure) versus light exposed time (FIG. 7). From FIG. 7 it can be seen that the $O_2$ evolution rate from CdS/Ti/Au/Goretex electrode was higher than from the Ti/Au/Goretex baseline and stable for more than 8 hours. This result should be compared to the usual degradation of CdS within several minutes under light/oxygen evolution.

The surface treatment, using polyacid and plasma polymerisation, is also a vital step to ensure a good cohesion between the catalyst and the membrane. It also opens the route to deposit the catalyst onto hydrophobic membranes. The possibility of merging this technology with some of the non-precious metal and metal oxide catalysts (Pletcher D, Li X. Prospects for alkaline zero gap water electrolysers for hydrogen production. *Int J Hydrogen Energy* 2011; 36:15089-104) that have limited possible use in PEM electrolysers will lead to a facile and cost efficient water splitting device. It is also possible to use this approach to enhance the lifetime of photo-active electro-catalysts, many of which are sensitive to the presence of oxygen bubbles.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A method of splitting water into hydrogen and oxygen in a water-splitting electrolysis cell, the method comprising:
   combining a first electrode having a conducting layer on a surface of a porous gas-permeable hydrophobic polymer membrane and a catalyst over the conducting layer with a counter-electrode in an electrochemical cell containing an aqueous electrolyte;
   applying a current to the electrochemical cell to produce hydrogen gas and oxygen gas from the aqueous electrolyte; and
   separately collecting the produced hydrogen gas directly from the first electrode and oxygen gas from the counter-electrode.

2. The method of claim 1, wherein collecting the hydrogen gas comprises collecting the hydrogen gas directly from the porous gas-permeable hydrophobic polymer membrane.

3. The method of claim 1, wherein the conducting layer is gold.

4. The method of claim 1, further comprising performing a surface treatment on the porous gas-permeable hydrophobic polymer membrane prior to applying the conducting layer to the surface.

5. The method of claim 4, wherein the surface treatment comprises a plasma treatment.

6. The method of claim 4, wherein the surface treatment comprises a polyacid treatment.

7. The method of claim 6, wherein the surface treatment comprises treating the membrane with maleic anhydride.

8. The method of claim 1, wherein the catalyst layer comprises platinum.

9. The method of claim 1, wherein the catalyst is a metal or a metal compound.

10. The method of claim 9, wherein the catalyst comprises one or more of the following: Pd, Ru, Ir, Mn, Fe, Ni, Co, $NiO_x$, Mn complexes, Fe complexes, $MoS_x$, CdS, CdSe, and GaAs.

11. The method of claim 1, wherein the polymer membrane is a polytetrafluoroethylene (PTFE) membrane.

12. The method of claim 1, wherein the polymer membrane comprises one or more of polyethylene (PE), polypropylene (PP), poly n-butyl methacrylate (PnBMA), polytrifluoroethylene, nylon, polybutadiene, and polychlorotrifluoroethylene (PCTFE).

13. The method of claim 1, wherein the polymer membrane comprises one or more of polydimethylsiloxane (PDMS), poly t-butyl methacrylate (PtBMA), fluorinated ethylene propylene (FEP), hexatriacontane, paraffin, poly (hexafluoropropylene), and polyisobutylene (PIB, butyl rubber).

14. The method of claim 1, wherein the porous membrane has a pore size of less than 0.5 µm.

15. The method of claim 14, wherein the porous membrane has a pore size of less than 0.1 µm.

16. The method of claim 15, wherein the porous membrane has a pore size of less than 0.05 µm.

17. The method of claim 1, wherein the porous membrane has a contact angle greater than 90°.

18. The method of claim 1, wherein the porous membrane has a contact angle from 100° to 115°.

\* \* \* \* \*